(12) United States Patent
Song

(10) Patent No.: US 9,933,187 B2
(45) Date of Patent: Apr. 3, 2018

(54) SYSTEM AND METHOD FOR GEOTHERMAL HEAT EXCHANGE

(71) Applicant: SaeHeum Song, Skillman, NJ (US)

(72) Inventor: SaeHeum Song, Skillman, NJ (US)

( * ) Notice: Subject to any disclaimer, the term of this patent is extended or adjusted under 35 U.S.C. 154(b) by 423 days.

(21) Appl. No.: 14/702,017

(22) Filed: May 1, 2015

(65) Prior Publication Data

US 2016/0123629 A1 May 5, 2016

Related U.S. Application Data

(60) Provisional application No. 62/075,310, filed on Nov. 5, 2014.

(51) Int. Cl.
*F28D 17/00* (2006.01)
*F24J 3/08* (2006.01)
*F28F 3/12* (2006.01)

(52) U.S. Cl.
CPC .............. *F24J 3/081* (2013.01); *F28F 3/12* (2013.01); *Y02E 10/12* (2013.01)

(58) Field of Classification Search
CPC ...... F24J 3/081; F24J 3/08; F28F 3/12; Y02E 10/10; Y02E 10/12
USPC .................................................... 165/10, 45
See application file for complete search history.

(56) References Cited

U.S. PATENT DOCUMENTS

| 3,965,972 | A | 6/1976 | Petersen |
| 4,011,905 | A | 3/1977 | Millard |
| 4,257,239 | A | 3/1981 | Partin et al. |
| 4,375,831 | A | 3/1983 | Downing, Jr. |
| 4,911,229 | A | 3/1990 | McElroy |
| 4,993,483 | A | 2/1991 | Harris |
| 5,339,890 | A | 8/1994 | Rawlings |
| 5,477,914 | A | 12/1995 | Rawlings |
| 5,730,208 | A | * | 3/1998 | Barban .................... F24J 3/086 165/45 |
| 5,816,314 | A | 10/1998 | Wiggs |

(Continued)

FOREIGN PATENT DOCUMENTS

| SU | 1575062 A1 | 1/1988 |
| SU | 1816938 A1 | 8/1990 |

(Continued)

*Primary Examiner* — Claire Rojohn, III
(74) *Attorney, Agent, or Firm* — Arthur Jacob

(57) ABSTRACT

Apparatus and method transfer heat between a geothermal mass and a geothermal heat exchange unit embedded within the geothermal mass, utilizing a geothermal heat exchange system comprised of the heat exchange unit. The unit includes a chamber enclosed by plate-like walls presenting a very large heat transfer area. The walls are spaced apart by a small distance compared to the heat transfer area, configuring the chamber to contain a thin, film-like volume of a liquid heat exchange medium. The heat exchange medium is flowed into and out of the chamber at a prescribed rate of flow, and the capacity of the chamber is such that the volume of heat exchange medium contained within the chamber during operation of the geothermal heat exchange system is great enough to enable the flowing heat exchange medium to mix with static, dwelled heat exchange medium maintained within the chamber as heat exchange medium flows through the chamber at the prescribed rate of flow and is circulated in the system.

14 Claims, 2 Drawing Sheets

(56) References Cited

U.S. PATENT DOCUMENTS

| | | | |
|---|---|---|---|
| 6,138,744 A * | 10/2000 | Coffee | F24F 5/0046 |
| | | | 165/45 |
| 6,338,381 B1 | 1/2002 | McClung, III | |
| 6,604,577 B2 | 8/2003 | Mulder | |
| 6,772,605 B2 | 8/2004 | Xu | |
| 6,789,608 B1 | 9/2004 | Wiggs | |
| 7,234,314 B1 | 6/2007 | Wiggs | |
| 7,856,839 B2 | 12/2010 | Wiggs | |
| 9,709,340 B2 * | 7/2017 | Furumura | F28F 3/12 |
| 2005/0061472 A1 | 3/2005 | Guynn et al. | |
| 2008/0196859 A1 | 8/2008 | Kidwell et al. | |
| 2009/0001185 A1 * | 1/2009 | Kroll | F24D 3/14 |
| | | | 237/60 |
| 2009/0101303 A1 * | 4/2009 | Henze | F28D 20/0034 |
| | | | 165/10 |
| 2009/0165992 A1 * | 7/2009 | Song | F24J 3/086 |
| | | | 165/45 |
| 2010/0193152 A1 * | 8/2010 | Singleton, Jr. | F24J 3/081 |
| | | | 165/45 |
| 2010/0307147 A1 * | 12/2010 | Ivy | F03G 3/00 |
| | | | 60/415 |
| 2011/0067437 A1 * | 3/2011 | Song | F25B 30/00 |
| | | | 62/513 |
| 2015/0368866 A1 * | 12/2015 | Hydock | E01C 13/02 |
| | | | 165/45 |

FOREIGN PATENT DOCUMENTS

| | | |
|---|---|---|
| WO | 2009086554 A1 | 7/2009 |
| WO | 2009142463 A2 | 11/2009 |

* cited by examiner

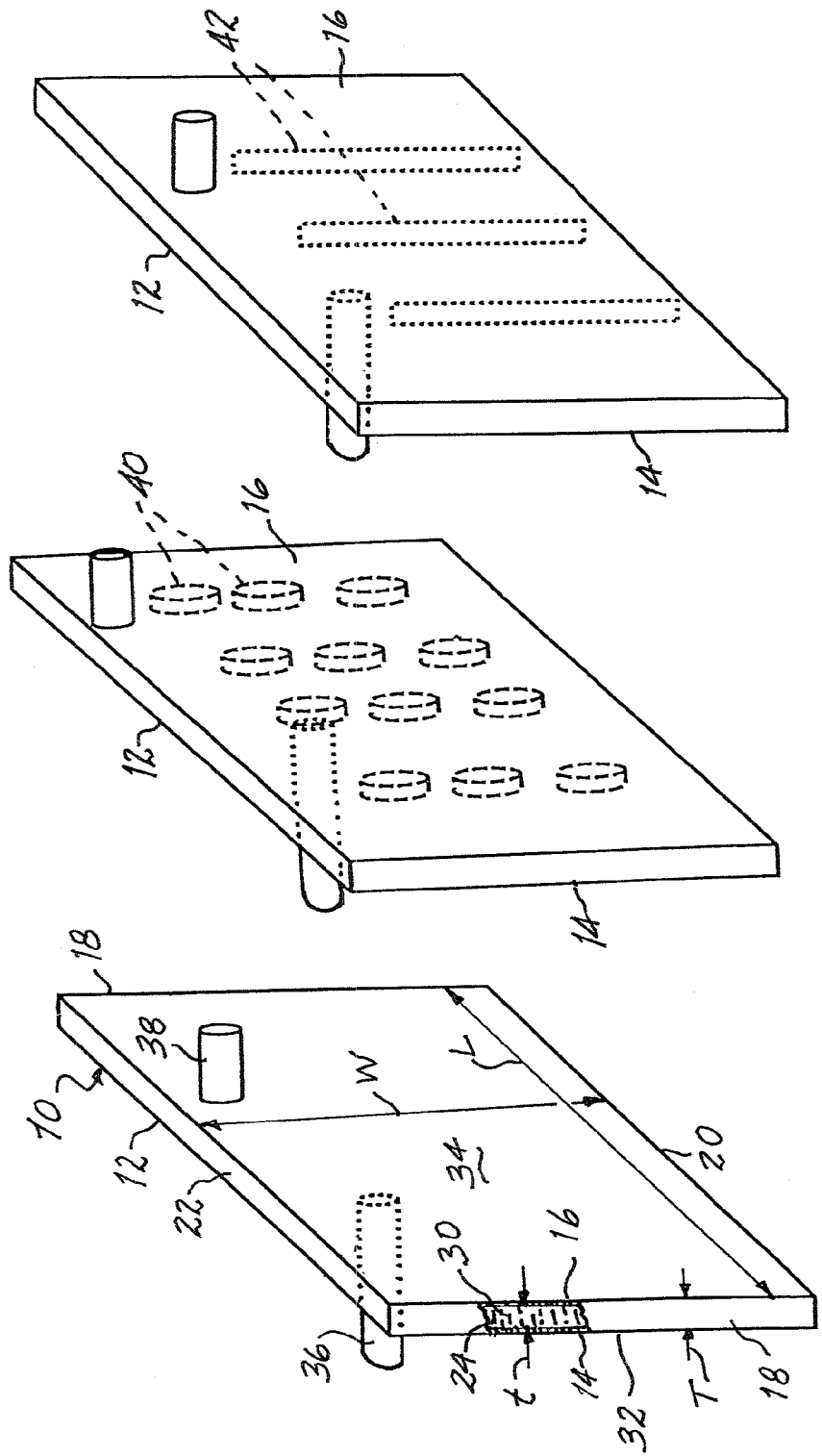

SYSTEM AND METHOD FOR GEOTHERMAL HEAT EXCHANGE

This application claims the benefit of U.S. Provisional Patent Application Ser. No. 62/075,310, filed Nov. 5, 2014.

The present invention relates generally to a system and method for underground geothermal heat exchange and recharging and pertains, more specifically, to the configuration and use of geothermal heat exchange units having a plate-like construction providing a very large heat exchange surface area combined with a very limited thickness to contain a film-like heat exchange fluid allowing rapid, almost immediate geothermal heat equilibrium with a surrounding geothermal mass without the need for an underground installation of relatively cumbersome devices to conduct geothermal heat exchange and heat storage, and concomitant deep drilling or the use of extensive land areas to attain effective geothermal heat exchange.

Geothermal heat pump systems currently are among the most efficient means for meeting heating and cooling needs. However, typical geothermal heat exchange installations require at least a few hundred feet of vertical drilling into a geothermal mass or, alternately, horizontal extension over large land areas. There are ongoing efforts to reduce the high costs related to extensive drilling depth or installations spread over large land areas. Among these efforts, the advent of coiled systems has offered a significant reduction in land area use, with little or no drilling requirements. A typical coiled system merely requires the installation of at least one helical geothermal piping unit, usually having a diameter of three to four feet. Such helically configured geothermal piping is believed to increase heat exchange by virtue of the increased heat exchange surface made available in each unit. However, these coiled systems still require relatively large land areas, as well as rather complex installation procedures, as compared to straight piping installations. These conventional geothermal heat exchange systems and methods extract available heat from a geothermal mass surrounding the geothermal heat exchange piping. Accordingly, heat exchange is limited by the limited surface area of the heat exchange medium immediately contiguous with the periphery of the heat exchange piping.

It has been suggested that large volume heat exchange units, constructed in a variety of generally cylindrical configurations, can be installed within the ground to bring these units into contiguity with a geothermal mass without the need for deep drilling or a requirement for extensive land area. Such installations rely upon large heat exchange surface areas provided by the relatively bulky heat exchange units. While these installations do provide some advantages, there are drawbacks resulting from the complexity of the units themselves, difficulties in managing the volume of heat exchange medium present in the system, and details of construction necessary to maintain structural integrity and robust performance over a reasonable service life.

In another aspect of the operation of a geothermal heat exchange system, prolonged use in either a heating mode or a cooling mode can cause a substantial decrease in the efficiency of the system. In most geographic regions, ambient air temperature fluctuates between daytime and nighttime. In some areas, that fluctuation can be considerable. Thus, even in winter, daytime temperature could be higher than the generally constant geothermal temperature, while in summer, nighttime temperature might be lower than the geothermal temperature, all resulting in decreases in the efficiency of a geothermal heat exchange system that must contend with such fluctuations in temperature. Therefore, it would be advantageous to provide for the storage of extra daytime heat in winter, and for the discharge of cooler air to the geothermal mass in summer, in order to increase the efficiency of a geothermal heat exchange system, thereby enabling a reduction in the requirement for geothermal mass and, consequently, for land area.

Advances in "clean energy" technology, such as passive or active solar heating systems, have enabled a cost-efficient production of heat; however, such heat usually is available only intermittently and must be stored for use in response to periodic demand. The present invention provides apparatus and method for effectively storing such energy in a geothermal mass, thereby reducing the land area required for the installation of geothermal heat exchange units while, at the same time, effecting recharging of the geothermal mass itself.

Taking into account that the amount of immediate heat exchange is proportional to the total surface area available for the exchange of heat between a donor and a recipient, an increase in such total available area can be attained by increasing the diameter of the pipe used to conduct a heat exchange medium through a geothermal mass. However, increased pipe diameter results in an increase in the volume of heat exchange medium circulated within the piping system, leading to the requirement for higher capacity circulating pumps operating with increased power consumption, and a significant increase in the cost of installation and operation, rendering the use of such a system impractical.

The present invention relies upon the principle that the heat exchanged at a particular pipe surrounded by a geothermal mass is a function of the perimeter and length of the heat exchange surface area provided by the pipe surface, together with the volume of heat exchange medium passing through the pipe, and the effectiveness of the heat exchange medium passing through the pipe is a function of the heat exchange surface area and the length of the pipe. Accordingly, the heat exchanged during the passage of a volume of heat exchange medium through any given length of pipe can be increased by increasing the heat exchange surface area made available to the heat exchange medium. The present invention takes advantage of an increased heat exchange surface area made available to the volume of heat exchange medium passing through the pipe without the disadvantage of presenting an increased volume of heat exchange medium within a given length of the pipe, as described above. Thus, heat exchange surface area is expanded, without a concomitant expansion of the volume of heat exchange medium, by flattening the heat exchange pipe to increase the heat exchange surface area provided by flattened opposite walls of the pipe while reducing the transverse spacing between those walls to preserve the total perimeter of the pipe and avoid an increase in the volume of heat exchange medium passing through a given length of the pipe. In this manner, the amount of heat exchanged is increased without necessitating an increase in the volume of heat exchange medium being circulated in the system. However, since the heat exchange medium is circulated under pressure, resulting in a tendency for the flattened walls to deviate from the essentially planar configuration of each flattened wall, it becomes advantageous to provide a reinforced structure while maintaining an effective heat transfer construction.

Accordingly, the present invention attains several objects and advantages, some of which are summarized as follows: Provides a geothermal heat exchange system in which heat exchange units have essentially flat, plate-like walls extending longitudinally and laterally and spaced apart transversely in close proximity to one-another to provide very large area heat exchange surfaces between which a heat exchange medium is contained in the form of a very thin, film-like volume of liquid for rapid heat exchange between a film-like volume of heat exchange medium and a surrounding geothermal mass; establishes a geothermal heat exchange system of the type described and in which the volumetric flow of the heat exchange medium into and out of each heat exchange unit during operation of the system, relative to the volume of heat exchange medium within each heat exchange unit, coupled with the configuration of each heat exchange unit, establishes a static, dwelled volume of heat exchange medium within each heat exchange unit to effect heat exchange by mixing and convection between the flow of heat exchange medium into the heat exchange unit and the static, dwelled volume of heat exchange medium within the heat exchange unit; facilitates a simplified, economical installation of a geothermal heat exchange system in a geothermal mass, requiring minimal excavation of the geothermal mass while conserving land area use; enables a rapid response to demands for heat or cooling; provides increased efficiency in a geothermal heat exchange system; enables effective use in conjunction with external intermittent sources of heat energy to allow heat storage within a geothermal mass; serves to recharge a geothermal mass as necessary; provides a geothermal heat exchange system having geothermal heat exchange units capable of effective robust performance over an extended service life.

The above objects and advantages are attained by the present invention which may be described briefly as a geothermal heat exchange unit for being embedded within a geothermal mass to effect a transfer of heat between the geothermal mass and a geothermal heat exchange system comprised of the heat exchange unit, the heat exchange unit comprising: a chamber enclosed by at least two plate-like walls constructed of a material possessing high heat conducting characteristics, each wall having a longitudinal length and a lateral width establishing a predetermined heat transfer area; the walls being spaced apart by a small transverse distance relative to the length and width of the walls, such that the chamber is configured to contain a thin, film-like volume of a liquid heat exchange medium; an inlet for admitting liquid heat exchange medium into the chamber at a prescribed rate of flow; and an outlet for conducting liquid heat exchange medium out of the chamber at the prescribed rate of flow; the chamber being configured such that the volume of liquid heat exchange medium contained within the chamber during operation of the geothermal heat exchange system is great enough to enable the liquid heat exchange medium flowing through the inlet at the prescribed rate of flow to mix with static, dwelled liquid heat exchange medium within the chamber as liquid heat exchange medium flows through the outlet at the prescribed rate of flow to be circulated in the geothermal heat exchange system.

In addition, the present invention provides a method for transferring heat between a geothermal mass and a geothermal heat exchange unit embedded within the geothermal mass, utilizing a geothermal heat exchange system comprised of the heat exchange unit, the method comprising: providing a chamber enclosed by at least two plate-like walls constructed of a material possessing high heat conducting characteristics, with each wall having a longitudinal length and a lateral width establishing a predetermined heat transfer area; spacing the walls apart by a small transverse distance relative to the length and width of the walls, such that the chamber is configured to contain a thin, film-like volume of a liquid heat exchange medium; providing an inlet for admitting liquid heat exchange medium into the chamber at a prescribed rate of flow; providing an outlet for conducting liquid heat exchange medium out of the chamber at the prescribed rate of flow; and configuring the chamber such that the volume of liquid heat exchange medium contained within the chamber during operation of the geothermal heat exchange system is great enough to enable the liquid heat exchange medium flowing through the inlet at the prescribed rate of flow to mix with static, dwelled liquid heat exchange medium within the chamber as liquid heat exchange medium flows through the outlet at the prescribed rate of flow to be circulated in the geothermal heat exchange system.

The above objects and advantages, as well as further objects and advantages. will become apparent in the following detailed description of preferred embodiments of the invention illustrated in the accompanying drawing, in which:

FIG. 1 is a pictorial view of a geothermal heat exchange unit constructed in accordance with the present invention;

FIG. 2 is a pictorial view similar to FIG. 1 and showing an alternate construction;

FIG. 3 is a pictorial view similar to FIG. 1 and showing another alternate construction.

Figure 4:
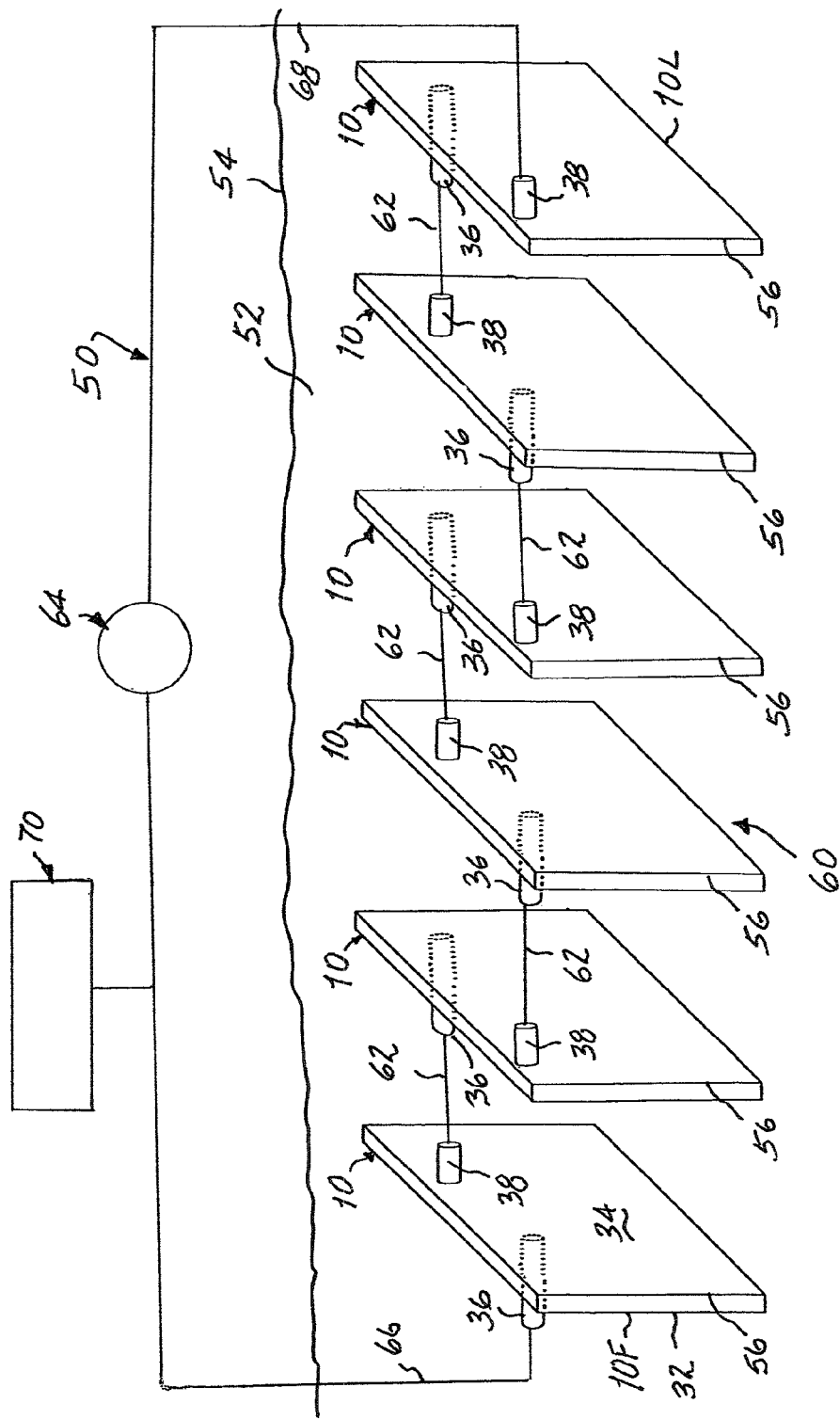
FIG. 4 is a somewhat diagrammatic, pictorial view of a geothermal heat exchange system constructed in accordance with the present invention and installed within a geothermal mass.

Referring now to the drawing, and especially to FIG. 1 thereof, a geothermal heat exchange unit constructed in accordance with the present invention is shown at 10 and is seen to include a plate-like container 12 having transversely opposite side walls 14 and 16 spaced apart by end walls 18, a bottom wall 20 and a top wall 22. Unit 10 has a longitudinal length L, a lateral width W and a transverse thickness T. Both the length L and the width W are very large in comparison to the thickness T, typical relative dimensions for each of length L and width W being about three to four feet, while thickness T preferably is no more than about one inch. Thus, container 12 provides a chamber 24 for holding a thin, film-like volume of a liquid heat exchange medium, shown in the form of water 30, the chamber 24 having a transverse thickness t for establishing a thin, film-like volume of water 30. In the preferred construction, thickness t is less than one inch. At the same time, side walls 14 and 16 provide respective heat exchange surfaces 32 and 34, with each heat exchange surface 32 and 34 having a very large area relative to the thickness t of chamber 24. An inlet tube 36 extends through side wall 14 to communicate with chamber 24 adjacent top wall 22, and an outlet tube 38 extends through side wall 16 to communicate with chamber 24, also adjacent top wall 22, each side wall 14 and 16 being constructed of a material having high thermal conductivity, for purposes set forth below.

In the preferred construction, walls 14 and 16 are relatively thin, in order to promote the transfer of heat between the water 30 in the chamber 24 and a surrounding, contiguous geothermal mass. Thus, with reference to FIG. 2, a structural feature may be incorporated between the walls 14 and 16, shown in the form of multiple disks 40 affixed to the walls 14 and 16 and spanning the transverse distance between the walls 32 and 34 to reinforce the walls against buckling or other distortion of the essentially planar configuration of each wall 14 and 16, especially during operation. The circular configuration of each disk 40 militates against disruption of the flow of water 30 within chamber 24. In an alternate construction, illustrated in FIG. 3, a plurality of beams 42 extend between the walls 14 and 16 and are affixed to the walls, spanning the transverse distance between the walls 14 and 16 to reinforce the walls against buckling or other distortion, especially during operation. The orientation of each beam 42 militates against disruption of the flow of water 30 within chamber 24.

Turning now to FIG. 4, a geothermal heat exchange system is illustrated, largely diagrammatically, at 50 and is seen to include six geothermal heat exchange units 10 installed within a geothermal mass, shown as earth 52, with the units 10 placed below frost line 54. Installation of the units 10 is rendered simple and economical by virtue of the thin configuration of each unit 10, each unit 10 merely requiring the excavation of a complementary narrow slot 56 in earth 52, into which slot 56 a unit 10 is inserted. The thin configuration of each unit 10 enables ready location and spacing of the units 10 from one-another, preferably by about three to four feet, to accommodate sufficient portions of earth 52 between units 10 without consuming an inordinate, extensive area of land. The individual units 10 are interconnected in a series 60 by fluid conduits 62 leading from the outlet tube 38 of one unit 10 to the inlet tube 36 of the next-consecutive unit 10. During operation of the system 50, a pump 64 circulates water 30 through the system 50, entering at an input conduit 66 connected to the inlet tube 36 of the first unit 10F of the series 60 and exiting at an output conduit 68 connected to the outlet tube 38 of the last unit 10L of the series 60.

Each unit 10 contains a prescribed volume of water 30 within chamber 24, which volume is spread over the thin, film-like configuration of that volume. The thin, film-like configuration of the volume is exposed to the relatively large heat transfer area provided by the respective heat exchange surfaces 32 and 34 of the walls 14 and 16, thereby promoting a rapid, almost instantaneous transfer of heat between the volume of water 30 in chamber 24 and the surrounding, contiguous earth 52. During operation of the system 50, water 30 is circulated by pump 64 at a rate of flow that enables the establishment of a static, dwelled volume of water 30 within each heat exchange unit 10 to effect heat exchange by mixing of the incoming water 30 and convection between the water 30 flowing into the heat exchange unit and the static, dwelled volume of water 30 within the unit 10, such mixing and convection being fostered by the location of the inlet and outlet tubes 36 and 38 adjacent the top wall 22 of each unit 10. Further, exposure of the static, dwelled volume of water 30 within each unit 10 to the relatively large heat transfer area provided by the respective heat transfer surfaces 32 and 34 of the walls 32 and 34, both during operation of the system 50 and during periods of rest, coupled with the thin, film-like configuration of the volume of water 30 accommodated within chamber 24, promotes a rapid, almost instantaneous transfer of heat between the static, dwelled volume of water 30 and the surrounding, contiguous earth 52.

As an added measure, an energy charging system may be incorporated into system 50, as illustrated at 70 in FIG. 4. Charging system 70 preferably is of a "clean energy" type, such as a passive or active solar heating system. During periods of operation of charging system 70, energy generated by charging system 70 will be stored in system 50 by operating system 50 in a charging mode to either store energy or recharge the earth 52 associated with system 50.

It will be seen that the present invention attains all of the objects and advantages summarized above, namely: Provides a geothermal heat exchange system in which heat exchange units have essentially flat, plate-like walls extending longitudinally and laterally and spaced apart transversely in close proximity to one-another to provide very large area heat exchange surfaces between which a heat exchange medium is contained in the form of a very thin, film-like volume of liquid for rapid heat exchange between a film-like volume of heat exchange medium and a surrounding geothermal mass; establishes a geothermal heat exchange system of the type described and in which the volumetric flow of the heat exchange medium into and out of each heat exchange unit during operation of the system, relative to the volume of heat exchange medium within each heat exchange unit, coupled with the configuration of each heat exchange unit, establishes a static, dwelled volume of heat exchange medium within each heat exchange unit to effect heat exchange by mixing and convection between the flow of heat exchange medium into the heat exchange unit and the static, dwelled volume of heat exchange medium within the heat exchange unit; facilitates a simplified, economical installation of a geothermal heat exchange system in a geothermal mass, requiring minimal excavation of the geothermal mass while conserving land area use; enables a rapid response to demands for heat or cooling; provides increased efficiency in a geothermal heat exchange system; enables effective use in conjunction with external intermittent sources of heat energy to allow heat storage within a geothermal mass; serves to recharge a geothermal mass as necessary; provides a geothermal heat exchange system having geothermal heat exchange units capable of effective robust performance over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A geothermal heat exchange unit for being embedded within a geothermal mass to effect a transfer of heat between the geothermal mass and a geothermal heat exchange system comprised of the geothermal heat exchange unit, the geothermal heat exchange unit comprising:

a chamber enclosed by at least two plate-like walls constructed of a material possessing high heat conducting characteristics, each wall having a longitudinal length and a lateral width establishing a predetermined heat transfer area;

the walls being spaced apart by a small transverse distance relative to the length and width of the walls, such that the chamber is configured to contain a thin, film-like volume of a liquid heat exchange medium;

a reinforcing structure within the chamber, affixed to the walls and spanning the small transverse distance between the walls, for militating against distortion of the walls;

an inlet for admitting liquid heat exchange medium into the chamber at a prescribed rate of flow; and an outlet for conducting liquid heat exchange medium out of the chamber at the prescribed rate of flow;

the chamber being configured such that the volume of liquid heat exchange medium contained within the chamber during operation of the geothermal heat exchange system is great enough to enable the liquid heat exchange medium flowing through the inlet at the prescribed rate of flow to mix with static, dwelled liquid heat exchange medium within the chamber as liquid heat exchange medium flows through the outlet at the prescribed rate of flow to be circulated in the geothermal heat exchange system.

2. The geothermal heat exchange unit of claim 1 wherein the longitudinal length and the lateral width each are about three to four feet, and the small transverse distance is less than about one inch.

3. A geothermal heat exchange unit for being embedded within a geothermal mass to effect a transfer of heat between the geothermal mass and a geothermal heat exchange system comprised of the geothermal heat exchange unit, the geothermal heat exchange unit comprising:
   a chamber enclosed by at least two plate-like walls constructed of a material possessing high heat conducting characteristics, each wall having a longitudinal length and a lateral width establishing a predetermined heat transfer area;
   the walls being spaced apart by a small transverse distance relative to the length and width of the walls, such that the chamber is configured to contain a thin, film-like volume of a liquid heat exchange medium;
   an inlet for admitting liquid heat exchange medium into the chamber at a prescribed rate of flow:
   an outlet for conducting liquid heat exchange medium out of the chamber at the prescribed rate of flow;
   the chamber being configured such that the volume of liquid heat exchange medium contained within the chamber during operation of the geothermal heat exchange system is great enough to enable the liquid heat exchange medium flowing through the inlet at the prescribed rate of flow to mix with static, dwelled liquid heat exchange medium within the chamber as liquid heat exchange medium flows through the outlet at the prescribed rate of flow to be circulated in the geothermal heat exchange system; and
   wherein the chamber includes an upper top and a lower bottom, the walls are oriented such that the upper top is elevated relative to the lower bottom, and the inlet and the outlet are located adjacent the upper top to facilitate mixing of the liquid heat exchange medium flowing through the inlet with the static, dwelled volume of liquid heat exchange medium within the chamber.

4. The geothermal heat exchange unit of claim 3 including a reinforcing structure within the chamber, affixed to the walls and spanning the small transverse distance between the walls for militating against distortion of the walls.

5. The geothermal heat exchange unit of claim 4 wherein the reinforcing structure comprises multiple disks.

6. The geothermal heat exchange unit of claim 4 wherein the reinforcing structure comprises a plurality of beams.

7. A geothermal heat exchange system comprising a plurality of geothermal heat exchange units of claim 1 for being embedded within the geothermal mass, connected in series, and a pump for circulating the liquid heat exchange medium serially through the plurality of geothermal heat exchange units.

8. The geothermal heat exchange system of claim 7 including an energy charging system for providing heat to the liquid heat exchange medium for recharging the geothermal mass.

9. A geothermal heat exchange system comprising a plurality of geothermal heat exchange units of claim 3 for being embedded within the geothermal mass, connected in series, and a pump for circulating the liquid heat exchange medium serially through the plurality of geothermal heat exchange units.

10. The geothermal heat exchange system of claim 9 including an energy charging system for providing heat to the liquid heat exchange medium for recharging the geothermal mass.

11. A method for transferring heat between a geothermal mass and a geothermal heat exchange unit embedded within the geothermal mass, utilizing a geothermal heat exchange system comprised of the geothermal heat exchange unit, the method comprising:
   providing a chamber enclosed by at least two plate-like walls constructed of a material possessing high heat conducting characteristics, with each wall having a longitudinal length and a lateral width establishing a predetermined heat transfer area;
   spacing the walls apart by a small transverse distance relative to the length and width of the walls, such that the chamber is configured to contain a thin, film-like volume of a liquid heat exchange medium;
   providing an inlet for admitting liquid heat exchange medium into the chamber at a prescribed rate of flow;
   providing an outlet for conducting liquid heat exchange medium out of the chamber at the prescribed rate of flow;
   configuring the chamber such that the volume of liquid heat exchange medium contained within the chamber during operation of the geothermal heat exchange system is great enough to enable the liquid heat exchange medium flowing through the inlet at the prescribed rate of flow to mix with static, dwelled liquid heat exchange medium within the chamber as liquid heat exchange medium flows through the outlet at the prescribed rate of flow to be circulated in the geothermal heat exchange system;
   providing the chamber with an upper top and a lower bottom;
   orienting the walls such that the upper top is elevated relative to the lower bottom; and
   locating the inlet and the outlet adjacent the upper top to facilitate the mixing of the liquid heat exchange medium flowing through the inlet with the static, dwelled volume of liquid heat exchange medium within the chamber.

12. The method of claim 11 wherein the longitudinal length and the lateral width of each wall are provided at about three to four feet, and the small transverse distance is provided at less than about one inch.

13. The method of claim 11 including providing a plurality of said geothermal heat exchange units for being embedded within the geothermal mass, connected in series, and a pump for circulating the liquid heat exchange medium serially through the plurality of geothermal heat exchange units.

14. The method of claim 13 including incorporating an energy charging system to provide heat to the liquid heat exchange medium for recharging the geothermal mass.

* * * * *